(No Model.)
2 Sheets—Sheet 1.
D. B. HASELTON.
CLEANING ATTACHMENT TO COTTON PICKERS.
No. 258,060. Patented May 16, 1882.
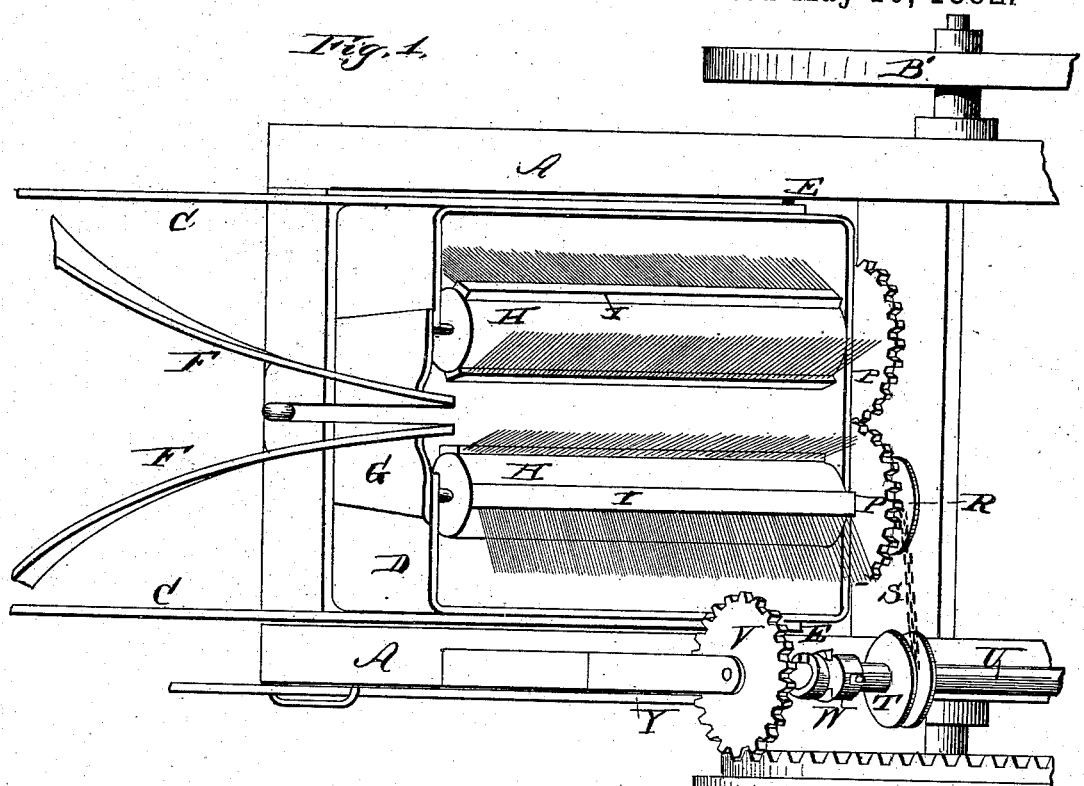
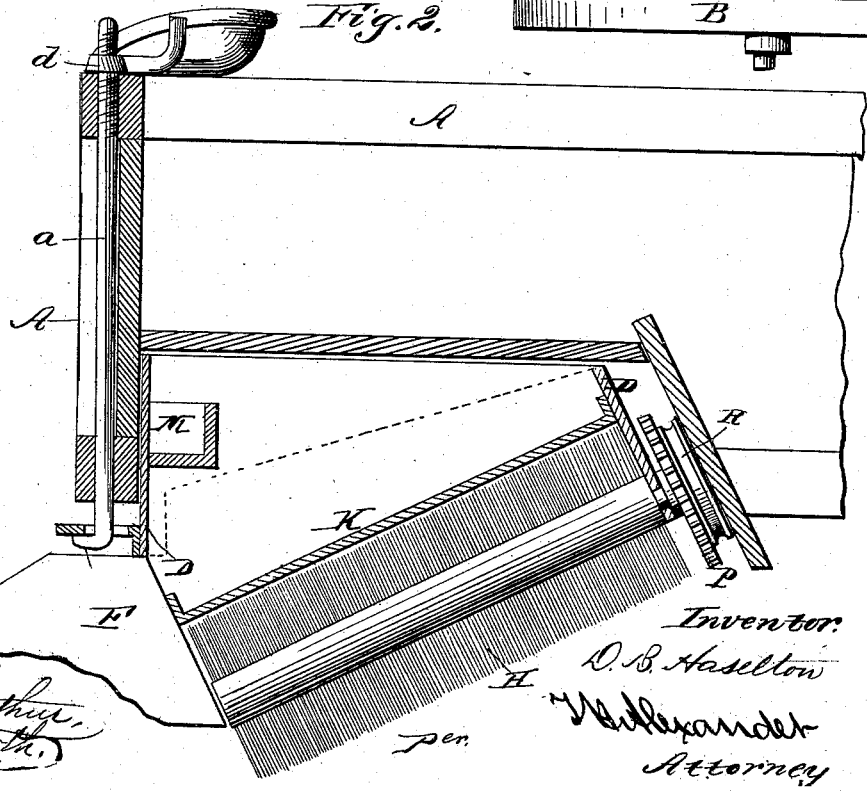
Witnesses.
W. C. McArthur,
W. R. Keyworth.
Inventor:
D. B. Haselton
per J. W. Alexander
Attorney

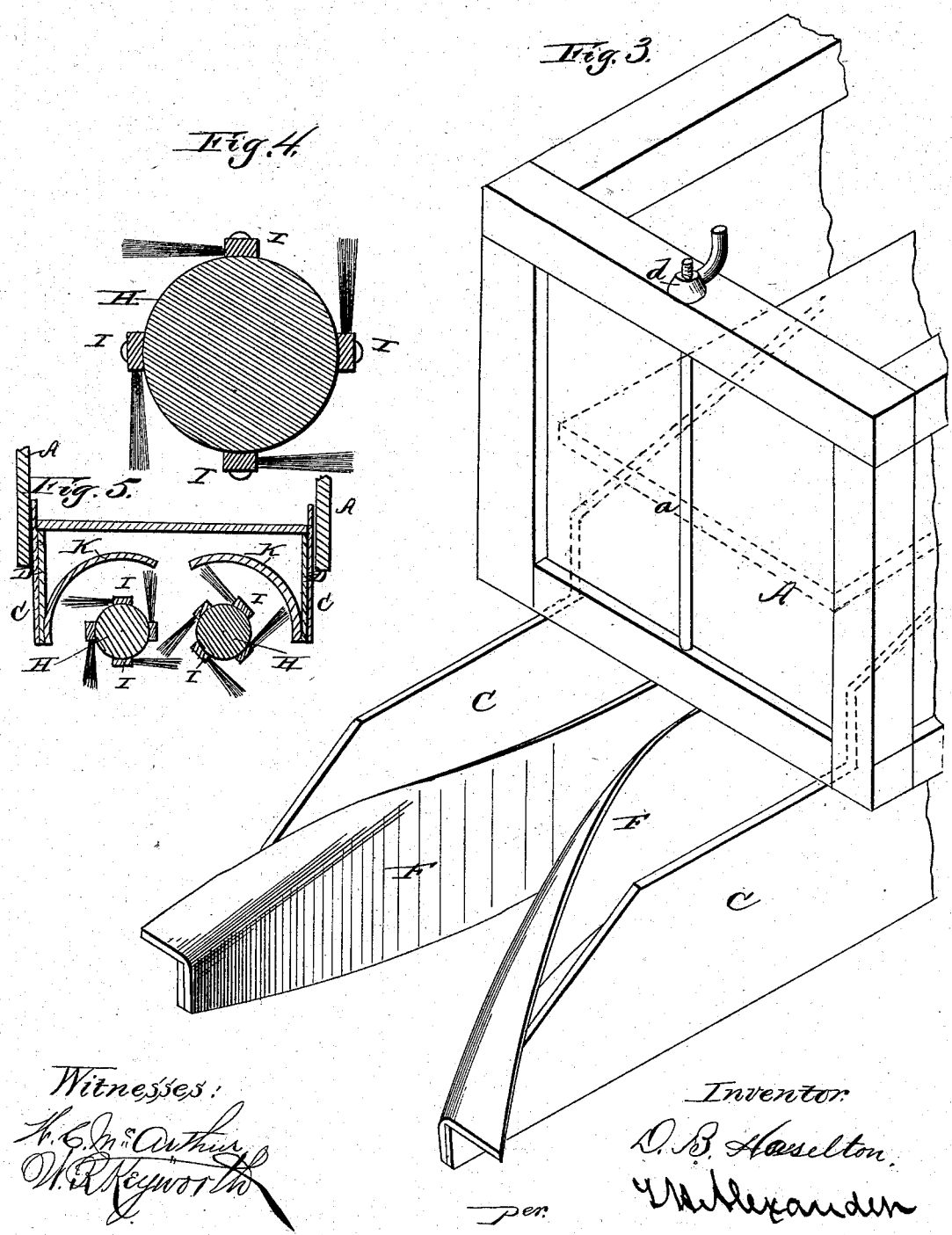

UNITED STATES PATENT OFFICE.

DANIEL B. HASELTON, OF CHARLESTON, SOUTH CAROLINA.

CLEANING ATTACHMENT TO COTTON-PICKERS.

SPECIFICATION forming part of Letters Patent No. 258,060, dated May 16, 1882.

Application filed August 18, 1881. (No model.)

*To all whom it may concern:*

Be it known that I, DANIEL B. HASELTON, of Charleston, in the county of Charleston and State of South Carolina, have invented certain new and useful Improvements in Cleaning Attachments to Cotton-Pickers; and I do hereby declare that the following is a full, clear, and exact description thereof, reference being had to the accompanying drawings, and to the letters of reference marked thereon, which form part of this specification, in which—

Figure 1 is a bottom plan view; Fig. 2, a central longitudinal section; Fig. 3, a perspective view of the forward end of the machine, and Fig. 4 a cross-section through one of the cleaning-brushes. Fig. 5 is a cross-section through the front of the machine.

This invention relates to cotton-cleaners, and has for its object to provide a machine that will gather together the projecting branches of the growing cotton-plant into proper position to be operated upon to clean the bolls and other parts of the plant, and remove and destroy insects previous to picking the cotton from the bolls.

To enable others skilled in the art to make and use my machine, I will now proceed to describe its construction and operation.

The letter A refers to the body or frame of my improved machine, which is mounted upon the wheels B and B'.

The letter D indicates a swinging adjustable frame. To the forward end of said frame are secured two forwardly-projecting gathering-plates, F.

C indicates the gatherer, which consists of two parallel side plates secured to the swinging adjustable frame D, pivoted at E to the main frame or body of the machine, and projecting forward below said body, as indicated in the drawings. To the forward extremities of said plates are attached the forward ends of two plates, F, which extend backward and converge, their rear ends being rigidly fastened to the front end of the swinging frame D or to a standard, G, secured thereto. The forward end of the frame D is raised and lowered by means of a screw-rod, *a*, running up through the frame of the machine, and provided with an adjusting-nut, *d*, on its upper end, as seen in Fig. 2. This allows of the frame carrying the inclined brushes being raised or lowered to correspond with the height of the lower branches of the plants to be cleaned, and also of being raised free of any obstructions when moving the machine from place to place. The upper edges of the plates F curve outward for the purpose of running under the projecting branches of the growing plant, (as seen in Fig. 3,) so as to gather the plants into a fan-like form and direct them between the converging plates and deliver them to the brushes or cleaners.

The letter H indicates the brushes or cleaners. These consist of two parallel rollers journaled in bearings at opposite ends of the swinging frame D, and provided with a series of longitudinal brush-holders, I, which are detachably secured to the rollers, so as to be readily removed and replaced when the brushes become worn. The brushes may be made of any suitable material, but are preferably made of broom-corn, and they are so arranged on their respective rollers as to work alternately between each other, as indicated in Fig. 5. It will be observed that these brushes are arranged on an incline toward the front of the machine, which enables them to operate upon plants at different stages of growth.

I am aware that fans have been used for beating the plants, and also that said fans have been made capable of vertical adjustment as well as horizontally; but experience has shown that it requires a more effective means of ridding the plants of insects, dirt, and dead leaves, and hence I adopt brushes, which I find accomplish the object in view much more perfectly.

The side plates, C, are extended upward into the forward end of the apparatus and form a receptacle or box above the cleaners or brushes, and above the brushes are located the curved guards K, having a space between their adjoining edges, through which the leaves, dirt, and insects brushed from the plant pass upward. At the forward end of the box or receptacle above named is located a transverse trough, M, for containing burning sulphur or other poison to destroy living insects brushed from the plants. The dirt and insects brushed up from the plants fall to the sides of the guards, and by reason of the inclination of the swinging frame will gravitate toward the front of the receptacle, where they may be discharged through suitable openings, if desired.

The receptacle or box before mentioned is provided with a suitable cover, and the rear journals of the brush or cleaner rollers are provided with intergearing cog-wheels P, one of which is formed with a pulley, R, from which extends a chain, S, to a pulley, T, upon the shaft U, the latter being provided with a loose pinion, V, and clutch W, the latter being operated by a lever, Y, to throw it into and out of gear, with the cogs upon the driving-wheel B, as seen in Fig. 1, and thus throw the brushes into or out of operation, as may be desired. The height of the body above the ground is to be such as to just clear the tops of the plants, which will vary according to the variety of cotton to be cleaned.

In operation the gatherers F run under the extending branches of the plant, and as the machine is drawn forward they are raised and drawn together without friction or any tendency to pull the plant out of the ground, and guided into proper position between the cleaning-rollers, which brush off all dirt, leaves, and insects without pressing the cotton from the boll. The machine is designed for cleaning the plants just before picking, and may be used to great advantage in connection with the cotton-picker for which a patent was issued to me June 28, 1881.

Having thus fully described my invention, what I claim as new, and desire to secure by Letters Patent, is—

1. The combination, in a cotton-cleaner, of the two cleaning-brushes placed upon an incline with their lower ends toward the front of the machine, with their operating mechanism, whereby the dirt, leaves, and insects are brushed from the growing plants previous to picking, substantially as specified.

2. The combination, in a cotton-cleaner, of cleaning-brushes, with the receptacle above the same, and the sulphur-receptacle for containing burning sulphur or other poison to destroy living insects brushed from the plants, substantially as specified.

3. The combination, with the rotary brushes and their guards, of the receptacle above the brushes, having channels at each side for the reception of the dirt and insects brushed off the plants, substantially as specified.

4. In combination with the swinging frame and the main frame, the screw-rod and adjusting-nut for elevating the frame, substantially as and for the purpose specified.

In testimony that I claim the foregoing as my own invention I affix my signature in presence of two witnesses.

DANIEL B. HASELTON.

Witnesses:
  WM. J. MILLER,
  WM. W. HOUSTON.